US011323676B2

(12) United States Patent
Romanenko et al.

(10) Patent No.: US 11,323,676 B2
(45) Date of Patent: May 3, 2022

(54) IMAGE WHITE BALANCE PROCESSING SYSTEM AND METHOD

(71) Applicant: Apple Inc., Cupertino, CA (US)

(72) Inventors: Ilya Romanenko, Loughborough (GB); Roberto Montagna, Cambridge (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/901,448

(22) Filed: Jun. 15, 2020

(65) Prior Publication Data
US 2020/0396434 A1 Dec. 17, 2020

(30) Foreign Application Priority Data
Jun. 13, 2019 (GB) .................................... 1908521

(51) Int. Cl.
*H04N 9/73* (2006.01)
*H04N 5/235* (2006.01)

(52) U.S. Cl.
CPC ............. *H04N 9/73* (2013.01); *H04N 5/2354* (2013.01)

(58) Field of Classification Search
CPC ........ H04N 9/73; H04N 9/735; H04N 1/6086; H04N 5/2351
USPC .................................................... 348/223.1
See application file for complete search history.

(56) References Cited

U.S. PATENT DOCUMENTS

| | | | | |
|---|---|---|---|---|
| 9,013,596 | B2* | 4/2015 | Hong | H04N 5/2354 348/223.1 |
| 9,519,839 | B2* | 12/2016 | Zhang | G06T 5/007 |
| 10,325,354 | B2* | 6/2019 | Noyes | G06T 7/50 |
| 10,805,588 | B2* | 10/2020 | Wang | G06K 9/3233 |
| 11,153,547 | B1* | 10/2021 | Huai | H04N 5/2355 |
| 2006/0177128 | A1* | 8/2006 | Raghupathy | H04N 9/735 382/167 |
| 2008/0101690 | A1* | 5/2008 | Hsu | H04N 1/6086 382/162 |
| 2011/0298946 | A1* | 12/2011 | Guan | H04N 5/235 348/223.1 |
| 2013/0321674 | A1* | 12/2013 | Cote | H04N 9/04557 348/242 |
| 2018/0176528 | A1* | 6/2018 | Li | H04N 9/77 |

* cited by examiner

Primary Examiner — Anthony J Daniels
(74) Attorney, Agent, or Firm — Blank Rome LLP

(57) ABSTRACT

One limitation of traditional imaging systems is that they are only programmed to correct for a single color of illuminant in a scene. In multi-illuminant scenes, the detected illuminant color may correspond to some mixture of scene illuminants. This may lead to incomplete color correction, wherein, e.g., the dominant illuminant is corrected for but the color cast caused by secondary illuminants is still visible, or an at least partially visible color cast remains from multiple of the scene illuminants. Thus, the techniques disclosed herein comprise: obtaining an image of a scene; generating an illumination map for the obtained image; dividing the values in the illumination map to determine a number of estimated illuminant regions, wherein each region corresponds to at least one estimated illuminant present in the captured scene; estimating a white point for each region; and applying white balancing operations, based on the estimated white points for each region.

20 Claims, 5 Drawing Sheets

IMAGE WHITE BALANCE PROCESSING SYSTEM AND METHOD

CROSS-REFERENCE TO RELATED APPLICATION

This application claims priority to the commonly-owned Great Britain patent application bearing serial number GB 1908521.6 and filed Jun. 13, 2019 ("the '521 application"). The '521 application is also hereby incorporated by reference in its entirety.

TECHNICAL FIELD

This disclosure relates generally to the field of digital image processing. More particularly, but not by way of limitation, it relates to techniques for applying white balance correction to a digital image.

BACKGROUND

Even though the color of objects is strongly influenced by the color of the light that illuminates them, human vision has the ability to maintain stability of perceived colors under a variety of different lighting conditions. This ability is also known as "color constancy." Changes in the color of illumination in a scene, without correction, may result in the introduction of color casts or other unnatural artifacts in a captured scene that may, e.g., cause a captured image to not accurately convey the look of the scene, especially with respect to the colors in the scene that a viewer would have observed when the scene was captured.

To mimic color constancy and deliver natural-looking pictures or videos, traditional imaging systems implement methods for Automatic White Balance (AWB). Most digital camera systems implement some form of AWB algorithms as part of the image capture process, and further white balancing may be done in post-processing. Typical AWB algorithms function in two stages: (1) they estimate the light color (also referred to herein as "white point") in the scene; and (2) they adjust the image to remove the color cast caused by the estimated illumination. Step (2) usually involves the multiplication of the RGB components of each pixel by some RGB gains determined in step (1), or a similar operation, e.g., performed with a Chromatic Adaptation Transform (CAT).

One limitation of traditional imaging systems is that they are only programmed to correct for a single color of illuminant in a scene. If multiple illuminants are detected, prior art approaches may only correct the captured image for the dominant illuminant, or, in some cases, for a mixture of the two illuminants. In multi-illuminant scenes, the detected illuminant color may actually correspond to some mixture of the various scene illuminants. This, in practice, may lead to incomplete color correction, wherein, e.g., either the dominant illuminant in the scene is corrected for but the color cast caused by secondary illuminants is still visible, or there is still a visible color cast remaining from all of the scene illuminants. Because photography and video capture under multiple illuminant conditions is a quite common use case, e.g., an indoor photograph taken with an open window in the background of the scene, it would be desirable to provide for more effective and complete color correction in such situations.

SUMMARY

Devices, methods, and non-transitory program storage devices are disclosed herein to provide an image white balance processing system and method that has improved accuracy for correcting white balance under multiple illuminants, compared with traditional white balance systems.

According to some embodiments, there is provided a method for image processing, comprising: obtaining an image, wherein the image comprises a first plurality of groups of one or more pixels; generating an illumination map for the image, wherein the illumination map comprises an illuminant estimate for each of the first plurality of groups of one or more pixels; and dividing the illuminant estimates from the illumination map into a first plurality of regions, wherein each region in the first plurality of regions corresponds to at least one estimated illuminant that the image was captured under. In some implementations, a predetermined maximum number of allowable regions may be specified.

According to some embodiments, the illumination map may be divided into the first plurality of regions, e.g., via the use of a k-means, fuzzy k-means, or other desired clustering algorithm. According to some embodiments, at least some of the regions may correspond to two or more estimated illuminants, e.g., as in the case of a fuzzy clustering algorithm. Next, the method may continue by estimating a white point of each determined region in the obtained image. According to some embodiments, an image's may also optionally be pre-classified (e.g., to a particular scene type, to natural light, to artificial light, etc.) and/or have its regional white point estimates constrained (e.g., using a pre-trained matrix, to within a predetermined distance of a particular locus in color space), in order to bias its final regional white point estimates to more reasonable or likely values. In some embodiments, gain maps determined based on the white point estimates may be smoothed over at least some of the image plane, e.g., to attempt to minimize any visually jarring transitions between illuminants in the final output image. In other embodiments, a correlated color temperature (CCT) may also be estimated for each of the determined regions. Finally, the method may continue by applying white balancing operations to the obtained image, using any desired technique, based on the estimated white points for the various regions of the image. In some cases, the white balancing operations may be applied independently to the various determined regions, while, in other cases, more sophisticated approaches may be used to attempt to prevent any artifact generation in the color correction processing.

Various non-transitory program storage device embodiments are disclosed herein. Such program storage devices are readable by one or more processors. Instructions may be stored on the program storage devices for causing the one or more processors to perform any of the image white balancing techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Note that, in the present specification, there are various references to light sources and lights. A "light source" and "illumination source" should be taken to mean the same thing (e.g., a lightbulb or other source of light). The term "light" refers to electromagnetic radiation, with visible light typically between 400 nm and 700 nm. The term "illuminant" refers to a light source, which will have a particular color.

Estimating the Number of Illuminants in a Captured Image

Figure 1:
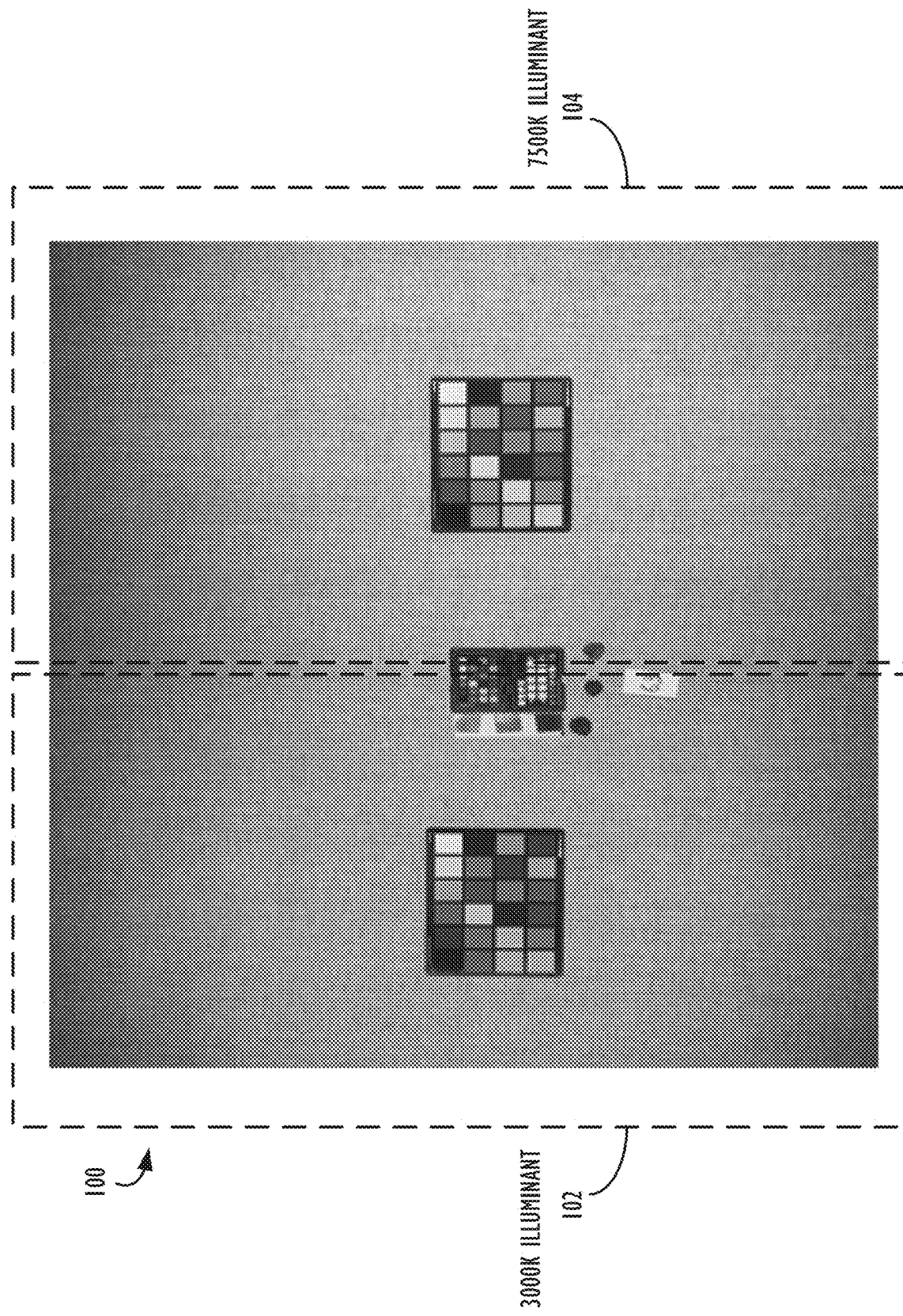
FIG. 1 illustrates an exemplary image illuminated with multiple illuminants.

Turning now to FIG. 1, an exemplary image 100 illuminated with multiple illuminants is illustrated. For example, portion 102 on the left hand side of image 100 is predominantly lit by an orangish (~3000K) illuminant, while portion 104 on the right hand side of image 100 is predominantly lit by a more blueish (~7500K) illuminant. If not corrected, the various colors in the different portions of image 100 may appear quite differently in the captured image, due do the different color illuminants. As may be appreciated, the portions 102/104 indicated in FIG. 1 are merely illustrative as, in reality, there may be portions of any multi-illuminant scene that are lit, at least in part, by more than one illuminant (e.g., the portions of the scene where portions 102/104 in FIG. 1 abut each other). Likewise, due to the composition of a given scene, e.g., the depth and placement of various objects in the scene, the placement of windows within a scene, etc., it is possible that the regions in a captured image of the scene illuminated by a given light source need not necessarily be contiguous. For example, in a captured image of a room, several objects distributed around the room may be estimated to have a single common illuminant, while the rest of the room may have a different mix of estimated illuminants.

In one embodiment, the image may be divided into a grid, e.g., an N×M grid (each of which divisions may also be referred to herein as a "tile"), and an illuminant may be estimated for each tile of the grid. Then, desired techniques, e.g., clustering techniques, may be used to estimate a number of possible illuminants in the scene.

Standard techniques for estimating the illuminant of each tile of the image may be used (e.g., grey world algorithms, white-patch algorithms, shades-of-grey algorithms, or other desired algorithms). In some scenarios, the image may also be pre-processed to enhance the accuracy of the illuminant estimates, if desired. For example, a separate algorithm may be applied to classify certain pixels as belonging to one or more "secondary light sources," which classifications may be used to modify the illuminant estimation process for the image. For example, pixels in an image corresponding to the sky may be thought of as representing a secondary light source in the scene, as, e.g., the sky is often re-emitting light from the Sun—but the spectrum of such light being re-emitted from the sky may actually be quite different from that of the Sun's illumination. As the result, if the captured scene is, for example, illuminated by both the Sun and the sky, then different parts of the scene can be illuminated in different proportions by each illumination source (e.g., especially within shadow regions in the image). Because of this potential interaction, it may be desirable not to use the sky's color exclusively when estimating the white point of a given region of pixels in the capture scene. Further, the sky's color can often be different in a scene, e.g., depending on the angle between the observer and the refracted light. As may now be understood, any pixel in such a captured scene may be illuminated by a mixture of the Sun's light and the sky's light, in varying proportions. Thus, as will be discussed in further detail below, at least partially overlapping estimated illuminant regions are expected in some images, wherein the estimated white points for such at least partially overlapping estimated illuminant regions may be determined according to some weighted combination of the multiple estimated illuminants occurring in the overlapping regions. In some cases, the regions corresponding to the multiple estimated illuminants may overlap across the entire extent of an image, effectively resulting in only a single region for the image, whose white point may be estimated based on a weighted combination of the multiple estimated illuminants. An alternative (or additional) pre-processing step, according to some embodiments, may also include desaturating the image to achieve better accuracy.

In one embodiment, an iterative process may then be applied to divide the tiles (i.e., based on their illuminant estimates) into a smaller number of regions, e.g., using one or more clustering algorithms, wherein each region corresponds to a respective one or more illuminants of the multiple illuminants in the captured image. In some cases, the number of possible illuminants that the image tiles may be divided into may be some predetermined number or allowable maximum number of illuminants, e.g., 2 illuminants or 4 illuminants per image.

In some embodiments, the iterative process may start with a set, L, containing all the illuminants estimated (e.g., N×M illuminants, in cases where the image is divided up into an N×M grid tiles). The iterative process of dividing the image into respective illuminant regions may begin by setting the number of illuminants, k, equal to 1 and initializing a set of clusters, C, to $\{c_0\}$, where $c_0$ is a cluster containing all the elements of L. In other words, all tiles may start out in a single cluster, no matter how widely-varying their illuminant estimates are.

To begin the clustering operation, for each cluster, $c_i$, in C, the process may determine the distances between each pair of illuminants in $c_i$, and then calculate their average (i.e., one average distance score per cluster). Next, if the maximum of the average distances is above a certain threshold, then increment k, re-cluster the illuminants yielding $C=\{c_0, \ldots, c_{k-1}\}$, and return to the first step of the iterative process (i.e., determining the average distances between each pair of illuminants in each cluster). Otherwise, if the maximum of the average distances is below the threshold, then k will be the number of estimated illuminants in the scene. In some cases, a maximum allowable number of illuminants, e.g., k=4, may be set, so that the iteration process terminates after a reasonable number of iterations. It will be appreciated that other thresholds may be used, depending on the particular application and circumstances.

As an alternative or additional approach, clustering algorithms designed to discover clusters autonomously may be used on the set, L, for example, the DBSCAN algorithm. Different metrics may be used to cluster illuminants, for example, quadratic Euclidean norm, CIE ΔE, CIE ΔC, angular error, or others.

Generating an Illumination Map

Figure 2:
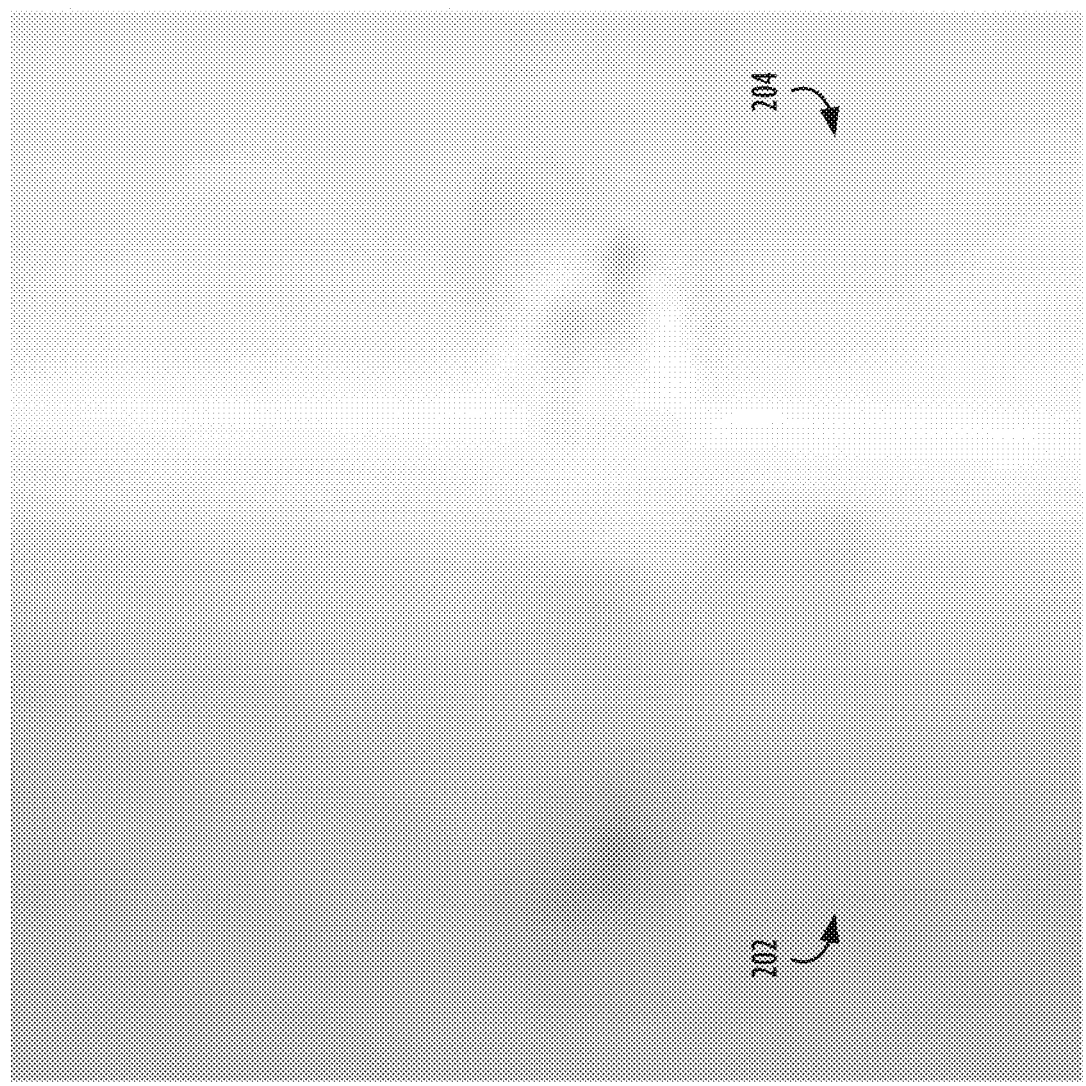
FIG. 2 illustrates an exemplary illumination map, according to one or more embodiments.

The above iterative clustering process provides a low resolution map of the illumination. Turning now to FIG. 2, an exemplary illumination map 200 corresponding to image 100 is illustrated, according to one or more embodiments. Region 202 corresponds to portion 102 on the left hand side of image 100 (reflecting the portion of the scene predominantly lit by an orangish illuminant), and region 204 corresponds to portion 104 on the right hand side of image 100 (reflecting the portion of the scene predominantly lit by a blueish illuminant).

In some embodiments, a more precise illumination map may be created using a convolution by an averaging kernel (which is equivalent to a pixel-wise grey-world algorithm). The illuminant estimate, E, at a pixel (x,y) of an image, I, can be expressed as:

$$E_c(x,y)=\Sigma_{u,v}I_c(x+u,y+v)K(u,v) \text{ where } c\in\{R,G,B\}, \text{ and } K \text{ is an averaging kernel} \quad \text{(Eqn. 1).}$$

Similarly, by applying norms appropriately, this formulation can be extended to the shades-of-grey family of algorithms. For example, with norm p, (Eqn. 1) becomes:

$$E_c(x,y)=[\Sigma_{u,v}I_c(x+u,y+v)^p K(u,v))]^{1/p} \quad \text{(Eqn. 2).}$$

Eqn. 2 may be employed with different norms, p, as well different kernels (for example, a Gaussian kernel or averaging kernel, among others). Alternatively, a different algorithm, such as the grey-edge formulation may be employed, i.e., instead of an image, I, the convolution kernel may be applied to the image's gradient magnitude, G.

However, there are some drawbacks to the illumination maps generated by the processes described above. For example, if the averaging kernel used is too large, the illumination map may not be sufficiently local. Moreover, many AWB algorithms have limitations. For example, grey-world, shades-of-grey, and grey-edge algorithms are purely statistical algorithms and use no knowledge of the imaging sensor or camera system that generated the image. These limitations can be attenuated to some extent with some heuristics (e.g., weighting pixels differently based on saturation or brightness) but often cannot be entirely overcome.

In some embodiments, it is preferable to use a second clustering stage to group together pixels with similar illuminants from the initial illuminant map. In one embodiment, each pixel or value of the illuminant map, M, may be considered an individual illuminant estimate, which estimates may be clustered. Again, a clustering algorithm, such as k-means (or fuzzy k-means), may be used to divide the images into regions that are estimated to be illuminated by different light sources, as will be discussed with regard to FIG. 3, below. As mentioned above, a number of different metrics may be used to generate the clusters, for example, quadratic Euclidean norm, CIE ΔE, CIE ΔC, angular error, or others.

Illuminant Estimates and Re-Clustering

Figure 3:
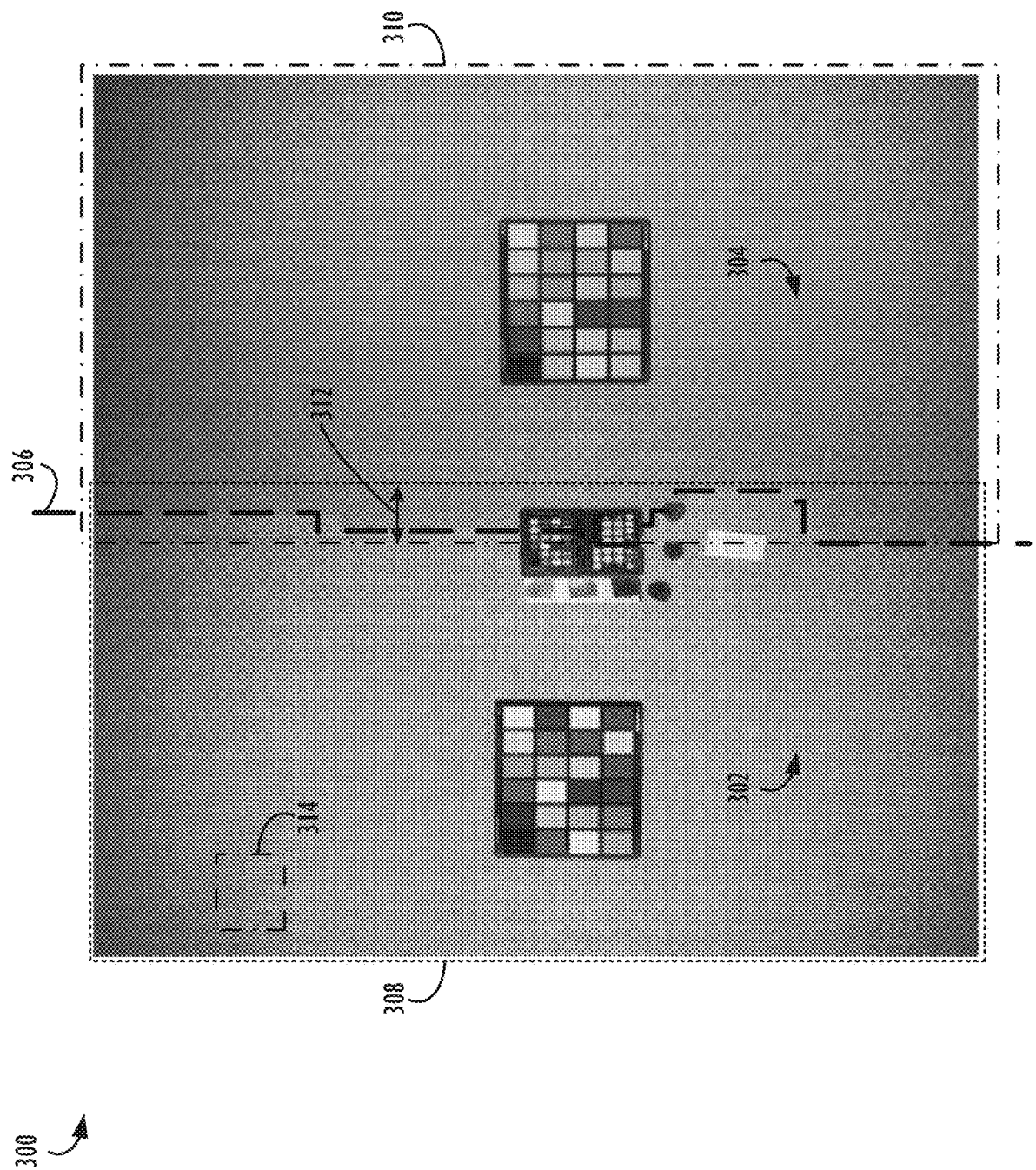
FIG. 3 illustrates an exemplary estimated illuminant region map, according to one or more embodiments.

Turning now to FIG. 3, an exemplary estimated illuminant region map 300 corresponding to image 100 is illustrated, according to one or more embodiments. At this stage, the image 100 may be divided into regions 302/304 corresponding to different estimated illumination sources, i.e., with region 302 (corresponding to the 3000K illuminant 102) existing to the left of dividing line 306 and region 304 (corresponding to the 7500K illuminant 104) existing to the right of dividing line 306. Preferably, the pixel information within each region is used to try to accurately estimate a single illuminant for each region.

As mentioned above, however, there may be portions of any multi-illuminant scene that are lit, at least in part, by more than one illuminant. For example, exemplary region 308 still corresponds to the 3000K illuminant 102, but it also shares some overlap (312) with region 310 that corresponds to the 7500K illuminant 104. In overlap region 312, the estimated white point for the image 100 may comprise: a weighted combination of the multiple estimated illuminants occurring in the overlapping regions. For example, using a fuzzy clustering algorithm, a given pixel (or group of pixels) in overlap region 312 may be deemed to be 60% a pixel corresponding to the region 308 estimated illuminant and 40% a pixel corresponding to the region 310 estimated illuminant, and thus have its white point determined according to an appropriate weighting operation. It is also reiterated here that, although illustrated as such in FIG. 3, the determined regions in a captured image corresponding to the estimated illuminants need not necessarily be contiguous. For example, there could be a portion 314 of the image 100 in the upper left-hand corner of map 300 that is also estimated to correspond to the region 310 estimated illuminant (i.e., an 'island' 314 within the regions of the image otherwise corresponding to the region 308 estimated illuminant), e.g., if that is what the image data indicated, which non-contiguous region would also be processed accordingly by the algorithm.

One reason for identifying and dividing an image into multiple (e.g., two or more) regions, which are processed differently for different estimated white points, is so that the resulting image may more accurately reflect the adaptivity of a human visual system (HVS). For example, identifying and correcting for multiple illuminants in a single captured image may be useful in helping camera devices to produce images having colors more closely in line with the perception of human viewers of the scene (i.e., not as the colors 'truly' are in the world). Examples of this phenomenon could include the following: humans do not perceive shadows in daylight scenes to be as blue as they actually can appear when captured by a camera; human faces illuminated by direct sun light are not perceived as orange as the camera can capture them; and human perception of tungsten light is not as yellow as it truly appears (especially in a presence of natural outdoor light). Thus, according to some embodiments, the boundaries between estimated illuminant regions can be sharp (as with the example of regions 302/304, divided by dividing line 306), however, if the light mixing proportions are changing along the object boundaries, the boundaries between estimated illuminant boundaries can be also fuzzy and overlapping (as with the example of regions 308/310). There are also situations, where multiple estimated illuminants may be mixed (either evenly or in different proportions) across the entire extent of the image, such that boundaries for multiple different estimated illuminant regions will not need to be determined (e.g., an outdoor scene without deep shadows may present such a scenario).

According to some embodiments, different illuminant estimators may be used for each region. In some embodiments, one or more additional constraints may be applied to the illuminant estimates to refine the accuracy of the baseline statistical illuminant estimators. For example, the possible illuminants may be constrained to a defined region around the Planckian locus (or other set of measured artificial light sources). This constraint may be applied in two stages. The first stage may be generated using a bias matrix, e.g., a 3×3 matrix, which may have bene generated using a training procedure (as will be discussed further below), that brings the illuminant estimate closer to the Planckian locus. The second stage may add an explicit projection towards the Planckian locus (which, in log-chromaticity color spaces, can be approximated with sufficient precision by a straight line).

The training procedure to generate the 3×3 bias matrix may, e.g., be based on an alternating least-squares (ALS) scheme. The ALS scheme may be implemented as follows. If A is a N×3 matrix of estimated illuminants, and B is a matrix of N×3 ground truth illuminants, then a matrix, H, may be solved for such that: $H:min\|DAH-B\|^2$, where D is a N×N diagonal matrix that adjusts the intensities of the estimates, accounting for the fact that it is possible to estimate the color of the illuminant (but not its intensity).

The training data may be a sufficiently large set of photos acquired under known illuminants. It may also be desirable to acquire training data for each imaging sensor that this white balancing process may be applied to. In other embodiments, the training data may be wholly- or partially-synthetically-generated. Synthetically-generated training data does not need to be realistic; it may instead be individual groups of pixels, wherein spatial relationships between pixels are ignored.

For example, light spectra may be simulated by using Planck's law for black body radiation, applying them to spectral reflectances, and using the XYZ color matching functions to obtain XYZ color coordinates, which may easily be converted into any color space of choice. An illuminant estimate can then be obtained for each of the synthetic images (or partial images) using a statistical-based estimator and populate the matrix A in Eqn. 3. Because the light spectra of each image is known, to obtain the illumination ground-truth, the XYZ color-matching functions may be used directly on the light spectrum, from which sRGB coordinates may be obtained to populate the matrix B in Eqn. 3.

In a preferred embodiment, a further step may be applied to improve the accuracy of illuminant estimation. Rather than training the set for a single matrix H, several matrices, $\{H_1, \ldots, H_n\}$, may be trained, e.g., one matrix each for a different class of illuminants. A classifier may then be trained to try and pre-estimate what kind of light is illuminating the scene (or a region of the scene). An example classification could be: natural warm, natural cool, artificial warm, artificial cool. Other, e.g., finer-grained scene classifications are also possible.

The aforementioned scene classification and Planckian locus projection steps may allow for the estimation of the correlated color temperature (CCT). Estimates of CCT may be useful in the color correction stage of an image processing pipeline.

Once illuminant estimates have been made for each region, additional re-clustering operations may be performed to merge together regions having illuminant estimates that are sufficiently close together. This additional re-clustering operation may be useful, as the illuminant estimates are more accurate than those made when generating the illumination map in the first place.

In some embodiments, other image processing techniques, such as image segmentation (e.g., techniques to classify which parts of the image are person, sky, background, etc.), may be used as an initial pass (or a further refinement) on the region determined by the illumination map generation process. In other embodiments, shadow segmentation may be employed (as cast shadows typically have a different white point than the rest of a captured scene). In other words, different white balancing techniques may be applied (or omitted), even within a single illuminant region if, e.g., the bottom half of the region is classified as mostly a human face and the top half of the region is classified as mostly sky, then differing color correction processes within a determined illuminant region may be justified.

Color Correction and Post-Processing

Once an illuminant estimate has been determined for each region, color correction operations may be performed on the image. In some cases, this may be achieved by dividing each color channel (e.g., each of the R, G, and B channels) by the corresponding component of the region's estimated white point. In other cases, color may be corrected by means of a chromatic adaptation transform (CAT), similarly to how the correction is applied for a global AWB operation. In some embodiments, there may be multiple color correction matrices (CCMs) to apply to the image data, depending on the CCT of the illuminant. In the above-described methods, different CCMs, as well as different illuminant corrections, may be used for each region of the image.

Artifact-Free Processing

Correcting the white balance of individual image regions independently may result in undesirable artifacts being generated along the boundaries between the regions. Thus, according to some embodiments, in order to improve the appearance of the output image, an optional step may be performed to create a gain map between the uncorrected version of the image and the color corrected version of the image. In this optional step, the gain map may be smoothed (over at least part of the image), e.g., with a large-scale kernel (such as a Gaussian kernel) or some other filter (e.g., a bilateral filter) and then applied to the input image.

An alternative approach to performing image correction without artifact generation is to use a different technology, such as that described in co-owned patent application No. PCT/GB2019/053251 ("the '251 application"), the content of which is hereby incorporated by reference in its entirety. The '251 application may be used to learn a transformation to produce a target 'look' for the final image without concerns about potential artifacts. For example, a corrected image (i.e., the corrected image formed by applying the regional multi-illuminant white balancing techniques of the present disclosure to the original image) may be used as a "target" look, and the approaches described in the '251 application may be employed to learn a set of transformations to apply the target look to the original input image, thereby producing an artifact-free and color-corrected final image. Another benefit of the approach of the '251 application is that the transformations needed to apply the target look may also be learned from a downscaled version of the input image and then applied to the full-resolution version of the input image to similarly generate an artifact-free and color-corrected full-resolution final image, while reducing processing demands during the learning process.

Exemplary Multi-Illuminant White Balancing Operations

Figure 4:
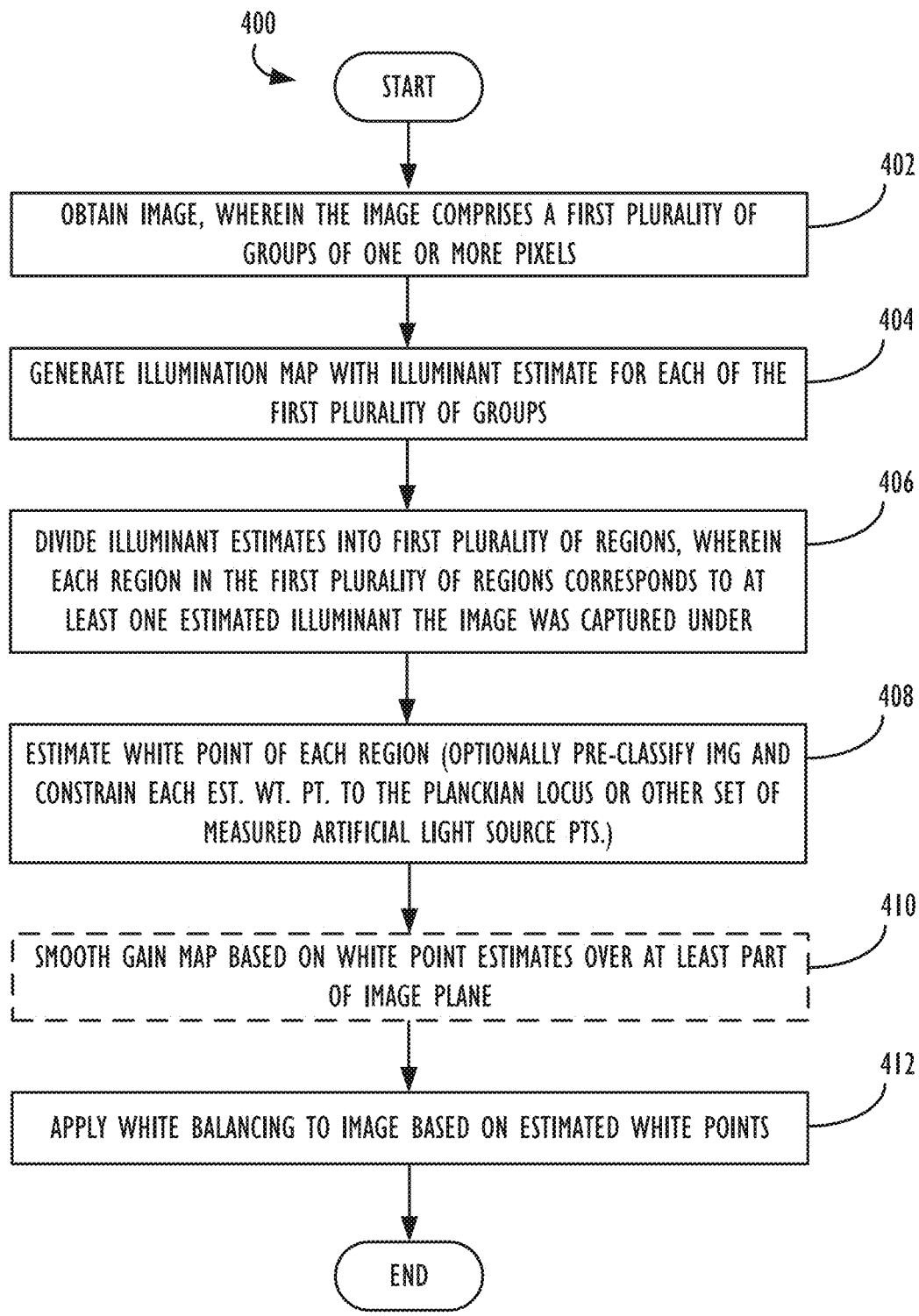
FIG. 4 is flow chart illustrating a method of performing image white balancing on images captured of multi-illuminant scenes, according to one or more embodiments.

Referring now to FIG. 4, a flow chart illustrating a method 400 of performing image white balancing on images captured of multi-illuminant scenes is shown, according to one or more embodiments. First, at Step 402, the method 400 may obtain an image, wherein the image comprises a first plurality of groups of one or more pixels. Next, at Step 404, the method 400 may generate an illumination map with illuminant estimates for each of the first plurality of groups. In some cases, the groups of pixels may comprise single pixels, while, in other cases, the groups of pixels may comprise tiles, e.g., 16×16 pixel tiles, 32×32 pixel tiles, etc. Next, at Step 406, the method 400 may divide the illuminant estimates into a first plurality of regions, e.g., using one or more stages of clustering algorithms, as described above, wherein each region in the first plurality of regions corresponds to a respective estimated illuminant that the image was captured under. Once the illumination map has been clustered to the desired level, the obtained image may be divided into estimated illuminant-based regions, as shown in FIG. 3. As noted above, these regions may be non-overlapping, or they may be at least partially overlapping, in some embodiments. Further, the individual regions may be contiguous across the extent of the image, or they may be non-contiguous, in some embodiments.

Next, at Step 408, the method may continue by estimating a white point of each determined region in the obtained image. As described above, according to some embodiments, the image may also optionally be pre-classified (e.g., to a particular scene type, to natural light, to artificial light, etc.) and/or have its regional white point estimates constrained (e.g., to within a predetermined distance of a particular locus in color space, such as the Planckian locus or other set of measured artificial light sources, by a pre-trained bias matrix), in order to bias the image's final regional white point estimates to more reasonable or likely values. In cases where a given region of the obtained image comprises two or more overlapping estimated illuminant regions (or, alternately, a single 'fuzzy' region containing pixels with probability or likelihood scores for multiple different estimated illuminants), the white points for the pixels in such regions may be calculated according to an appropriate weighted combination of the various relevant estimated illuminants, as described above. In cases where the regional white point estimates fail, e.g., due to predominantly mono-tonal scene content or any other reason, the method may fall back and rely on a global AWB white point estimate and anchor the regional white point estimates to the global AWB white point estimate, or some other default value, e.g., a D50, D55, or D65 white point. In some cases, an infrared (IR) sensor may be used to provide an initial clue as to whether a given image was taken outdoors in natural light or indoors in artificial light.

In some embodiments, at Step 410, a gain map determined based on the estimated white points for the first plurality of regions may optionally be smoothed over at least part of the image plane, e.g., to attempt to minimize any visually jarring transitions between illuminants in the final output image. Finally, the method may continue at Step 412 by applying white balancing operations to the obtained image, using any desired technique, based on the estimated white points for the various regions of the image. As mentioned above, in some cases, once the multi-illuminant regional white balancing techniques of method 400 have been applied, various additional processing techniques may be employed to remove unwanted artifacts from the output image, such as the techniques of the aforementioned '251 application.

Exemplary Electronic Computing Devices

Figure 5:
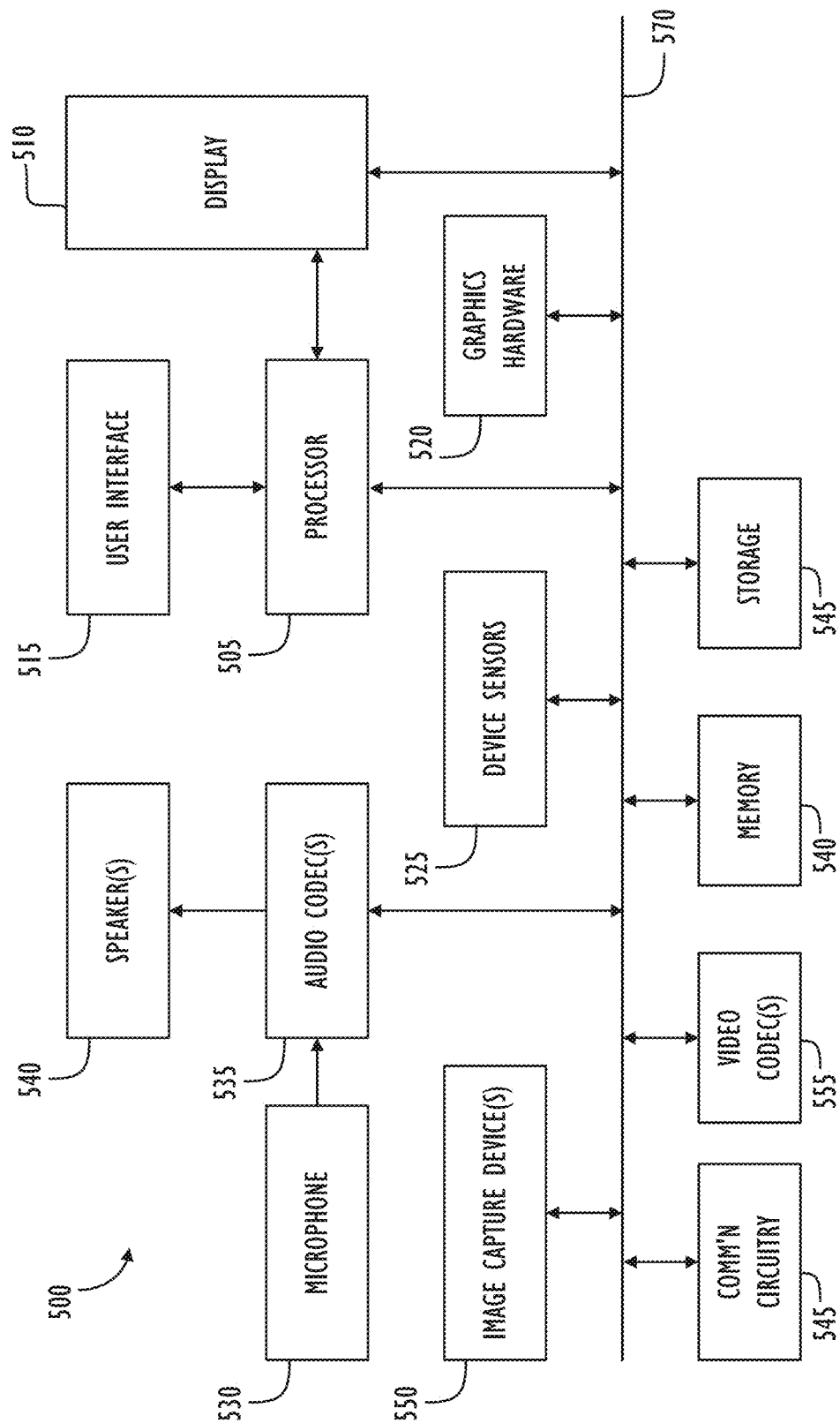
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be processed to generate color-balanced versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
    a memory;
    one or more image capture devices;
    a user interface; and
    one or more processors operatively coupled to the memory, wherein the one or more processors are configured to execute instructions causing the one or more processors to:
        obtain an image, wherein the image comprises a first plurality of groups of one or more pixels;
        generate an illumination map for the image, wherein the illumination map comprises an illuminant estimate for each of the first plurality of groups of one or more pixels;
        divide the illuminant estimates from the illumination map into a first plurality of regions, wherein each region in the first plurality of regions corresponds to at least one estimated illuminant that the image was captured under;
        estimate a white point for each of the first plurality of regions; and
        apply a white balancing gain to each region of the first plurality of regions, wherein the white balancing gain applied to each region corresponds to the respective estimated white point for the region.

2. The device of claim 1, wherein the first plurality of groups of one or more pixels further comprise a grid of pixel tiles comprising the image, and wherein each pixel tile comprises two or more pixels.

3. The device of claim 1, wherein the instructions causing the one or more processors to divide the illuminant estimates from the illumination map into a first plurality of regions further comprise instructions causing the one or more processors to:
    cluster the illuminant estimates from the illumination map into at most a predetermined maximum number of regions.

4. The device of claim 1, wherein the instructions causing the one or more processors to divide the illuminant estimates from the illumination map into a first plurality of regions further comprise instructions causing the one or more processors to:
    cluster the illuminant estimates from the illumination map using at least one of: a k-means algorithm; or a fuzzy k-means algorithm.

5. The device of claim 1, wherein the instructions causing the one or more processors to estimate a white point for each of the first plurality of regions further comprise instructions causing the one or more processors to:
    constrain each estimated white point towards a Planckian locus or a set of measured artificial light sources.

6. The device of claim 5, wherein the instructions causing the one or more processors to constrain each estimated white point towards a Planckian locus or a set of measured artificial light sources further comprise instructions causing the one or more processors to:
    constrain each estimated white point towards a Planckian locus or a set of measured artificial light sources using a pre-trained matrix.

7. The device of claim 6, wherein the pre-trained matrix is trained, at least in part, using synthetically-generated image data.

8. The device of claim 1, wherein the instructions causing the one or more processors to divide the illuminant estimates from the illumination map into a first plurality of regions further comprise instructions causing the one or more processors to divide the illuminant estimates from the illumination map into a first plurality of regions further based, at least in part on:
    a scene classification of the image; or
    a semantic segmentation operation performed on the image.

9. The device of claim 1, wherein the one or more processors are further configured to execute instructions causing the one or more processors to:
    smooth a gain map determined based on the estimated white points for the first plurality of regions; and
    apply the white balancing gains further based on the smoothed gain map.

10. The device of claim 1, wherein the one or more processors are further configured to execute instructions causing the one or more processors to:
    estimate a correlated color temperature (CCT) for each of the first plurality of regions; and
    apply the white balancing gains further based on the estimated CCTs.

11. The device of claim 1, wherein the white balancing gains are applied independently to each of the first plurality of regions.

12. A non-transitory computer readable medium comprising computer readable instructions configured to cause one or more processors to:
    obtain an image, wherein the image comprises a first plurality of groups of one or more pixels;

generate an illumination map for the image, wherein the illumination map comprises an illuminant estimate for each of the first plurality of groups of one or more pixels;

divide the illuminant estimates from the illumination map into a first plurality of regions, wherein each region in the first plurality of regions corresponds to at least one estimated illuminant that the image was captured under;

estimate a white point for each of the first plurality of regions; and apply a white balancing gain to each region of the first plurality of regions, wherein the white balancing gain applied to each region corresponds to the respective estimated white point for the region.

13. The non-transitory computer readable medium of claim 12, wherein the instructions causing the one or more processors to estimate a white point for each of the first plurality of regions further comprise instructions causing the one or more processors to:

constrain each estimated white point towards a Planckian locus or a set of measured artificial light sources.

14. The non-transitory computer readable medium of claim 13, wherein the instructions causing the one or more processors to constrain each estimated white point towards a Planckian locus or a set of measured artificial light sources further comprise instructions causing the one or more processors to:

constrain each estimated white point towards a Planckian locus or a set of measured artificial light sources using a pre-trained matrix.

15. The non-transitory computer readable medium of claim 12, wherein a first one of the first plurality of regions corresponds to at least two estimated illuminants.

16. The non-transitory computer readable medium of claim 15, wherein the instructions causing the one or more processors to estimate a white point for each of the first plurality of regions further comprise instructions causing the one or more processors to estimate a white point for the first one of the first plurality of regions further based, at least in part on:

a weighted combination of an estimated white point for each of the at least two estimated illuminants.

17. An image processing method, comprising:

obtaining an image, wherein the image comprises a first plurality of groups of one or more pixels;

generating an illumination map for the image, wherein the illumination map comprises an illuminant estimate for each of the first plurality of groups of one or more pixels;

dividing the illuminant estimates from the illumination map into a first plurality of regions, wherein each region in the first plurality of regions corresponds to at least one estimated illuminant that the image was captured under;

estimating a white point for each of the first plurality of regions; and applying a white balancing gain to each region of the first plurality of regions, wherein the white balancing gain applied to each region corresponds to the respective estimated white point for the region.

18. The method of claim 17, wherein dividing the illuminant estimates from the illumination map into a first plurality of regions further comprises:

clustering the illuminant estimates from the illumination map into at most a predetermined maximum number of regions.

19. The method of claim 17, further comprising:

smoothing a gain map determined based on the estimated white points for the first plurality of regions; and applying the white balancing gains further based on the smoothed gain map.

20. The method of claim 17, further comprising:

estimating a correlated color temperature (CCT) for each of the first plurality of regions; and applying the white balancing gains further based on the estimated CCTs.

* * * * *